(12) United States Patent
Miyauchi et al.

(10) Patent No.: US 12,416,531 B2
(45) Date of Patent: Sep. 16, 2025

(54) TEMPERATURE SENSOR, TEMPERATURE DETECTION DEVICE AND IMAGE FORMATION DEVICE

(71) Applicant: SHIBAURA ELECTRONICS CO., LTD., Saitama (JP)

(72) Inventors: Masayuki Miyauchi, Saitama (JP); Morihisa Hamada, Saitama (JP); Yuri Okada, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 528 days.

(21) Appl. No.: 17/905,204

(22) PCT Filed: Dec. 17, 2020

(86) PCT No.: PCT/JP2020/047200
§ 371 (c)(1),
(2) Date: Aug. 29, 2022

(87) PCT Pub. No.: WO2021/210218
PCT Pub. Date: Oct. 21, 2021

(65) Prior Publication Data
US 2023/0143488 A1 May 11, 2023

(30) Foreign Application Priority Data

Apr. 15, 2020 (JP) ................................. 2020072858

(51) Int. Cl.
*G01K 7/24* (2006.01)
*G01K 13/08* (2006.01)

(52) U.S. Cl.
CPC ............... *G01K 7/24* (2013.01); *G01K 13/08* (2013.01)

(58) Field of Classification Search
CPC ................................. G01K 7/24; G01K 13/08
See application file for complete search history.

(56) References Cited

U.S. PATENT DOCUMENTS 5,366,291 A * 11/1994 Nakagama ......... G03G 15/2039
374/208
6,252,207 B1 6/2001 Cahill et al.
(Continued)

FOREIGN PATENT DOCUMENTS

JP    S62161342 A    7/1987
JP    H04115131 A    4/1992
(Continued)

OTHER PUBLICATIONS

International Search Report for PCT/JP2020/047200 dated Mar. 16, 2021 and the translation thereof.
(Continued)

*Primary Examiner* — Randy W Gibson
(74) *Attorney, Agent, or Firm* — McDonald Hopkins LLC (57) ABSTRACT

A temperature sensor that sufficiently has heat insulation property and the pressing force to a temperature measurement object to a degree allowing a ceramic paper to be substituted, and that has a good responsiveness, and a temperature detection device and an image formation device that include the temperature sensor. The temperature sensor is disposed so as to maintain an abutting state with a temperature measurement object, the temperature sensor including: a thermosensitive element configured to detect the temperature of the temperature measurement object; a heat collection member configured to pressurize the temperature measurement object and to be thermally coupled with the thermosensitive element; and a holding member supporting the heat collection member and forming a space that faces the heat collection member.

18 Claims, 9 Drawing Sheets

(56) References Cited

U.S. PATENT DOCUMENTS

| | | |
|---|---|---|
| 2017/0268935 A1 | 9/2017 | Hua |
| 2023/0244162 A1* | 8/2023 | Tagami ................ G03G 15/605 399/328 |
| 2023/0244163 A1* | 8/2023 | Miyazaki ................ G01K 7/18 399/69 |

FOREIGN PATENT DOCUMENTS

| | | |
|---|---|---|
| JP | H09218102 A | 8/1997 |
| JP | 2002122489 A | 4/2002 |
| JP | 2017525979 A | 9/2017 |
| WO | 2012105110 | 9/2012 |

OTHER PUBLICATIONS

Written Opinion for PCT/JP2020/047200 dated Mar. 16, 2021.
Office action for Japanese application No. JP2020-072858 dated Nov. 10, 2021 and translation thereof.

\* cited by examiner

TEMPERATURE SENSOR, TEMPERATURE DETECTION DEVICE AND IMAGE FORMATION DEVICE

CROSS-REFERENCE TO RELATED APPLICATIONS

This is a National Stage application of PCT international application PCT/JP2020/047200, filed on Dec. 17, 2020 which claims priority to Japanese Patent Application No. 2020-072858, filed on Apr. 15, 2020, the contents of which are incorporated herein by reference in their entireties.

TECHNICAL FIELD

The present invention relates to a temperature sensor that detects the temperature of an object, a temperature detection device and an image formation device.

BACKGROUND ART

There has been known a temperature detection device that is disposed so as to contact with a heater provided in a thermal fixing roller for controlling the temperature of the thermal fixing roller included in an image formation device such as a printer using an electrophotographic process, for example (Patent Literature 1, for example).

The temperature detection device in Patent Literature 1 includes a temperature detection element, a sensor main body having an insert-molded conduction member to provide the conduction between a lead wire of the temperature detection element and a covered electric wire of a circuit portion, and a heat-resistant elastic body interposed between the sensor main body and the temperature detection element. The sensor main body is elastically supported by a support body through a coil spring. The temperature detection element is pressed to the heater by the elastic force of the heat-resistant elastic body. As the heat-resistant elastic body, a ceramic paper formed from fibers composed of an inorganic material is typically used.

CITATION LIST

Patent Literature

Patent Literature 1: JP 2002-122489 A

SUMMARY OF INVENTION

Technical Problem

In recent years, there has been a demand for a temperature sensor in which the ceramic paper is not used.

The present invention has an object to provide a temperature sensor that has heat insulation property, the pressing force to a temperature measurement object and a good responsiveness, without the ceramic paper, and a temperature detection device and an image formation device that include the temperature sensor.

Solution to Problem

The present invention is a temperature sensor that is disposed so as to maintain an abutting state with a temperature measurement object, the temperature sensor characterized by including: a thermosensitive element configured to detect the temperature of the temperature measurement object; a heat collection member configured to pressurize the temperature measurement object and to be thermally coupled with the thermosensitive element; and a holding member supporting the heat collection member and forming a space that faces the heat collection member.

In the temperature sensor of the present invention, it is preferable that the heat collection member be a plate spring.

In the temperature sensor of the present invention, it is preferable that the heat collection member include a main body portion where the thermosensitive element is disposed, and that an end portion of the main body portion be supported by the holding member, and the main body portion be pressurized to the temperature measurement object side by elastic force.

In the temperature sensor of the present invention, it is preferable that the heat collection member include a pair of leg portions supported by the holding member, at both end portions of the main body portion, and that the main body portion be pressurized to the temperature measurement object side by the elastic force of the leg portions.

In the temperature sensor of the present invention, it is preferable that an element disposition portion for disposing the thermosensitive element be formed at the main body portion.

In the temperature sensor of the present invention, it is preferable that the holding member include an element support portion supporting the thermosensitive element through the element disposition portion.

In the temperature sensor of the present invention, it is preferable that the element disposition portion be formed in a concave shape at a part of the main body portion, and that the thermosensitive element be accommodated in the element disposition portion.

In the temperature sensor of the present invention, it is preferable that the main body portion be formed in a substantially rectangular shape in planar view, and be supported by the holding member, at leg portions included in both end portions in a longitudinal direction, and that the element disposition portion be formed so as to extend in a short direction of the main body portion and to bend in an out-of-plane direction of the main body portion.

In the temperature sensor of the present invention, it is preferable that the heat collection member include a plurality of positioning pieces that are inserted into the space.

In the temperature sensor of the present invention, it is preferable that the holding member include a wall body forming the space, and a contact protrusion protruding from the wall body and contacting with the positioning pieces be formed on the wall body.

In the temperature sensor of the present invention, it is preferable that the holding member include a wall body forming the space, that the heat collection member be supported by a distal end of a part of the wall body, and that the wall body have a lower height at a position where the heat collection member is supported, than the height at the other position.

In the temperature sensor of the present invention, it is preferable that a first insulating material covering the heat collection member from the temperature measurement object side be disposed between the thermosensitive element and the temperature measurement object.

In the temperature sensor of the present invention, it is preferable that the first insulating material be formed in a film shape.

In the temperature sensor of the present invention, it is preferable that the thermosensitive element include a thermosensitive body having a resistance value that changes depending on temperature change, and a lead wire for electrically connecting the thermosensitive body to an external circuit, and that a second insulating material configured to insulate at least the lead wire of the thermosensitive element and the heat collection member be disposed between the thermosensitive element and the heat collection member.

In the temperature sensor of the present invention, it is preferable that the second insulating material be formed in a film shape, and cover the heat collection member from the temperature measurement object side.

In the temperature sensor of the present invention, it is preferable that the thermosensitive element include a thermosensitive body having a resistance value that changes depending on temperature change, and a pair of lead wires for electrically connecting the thermosensitive body to an external circuit, and that the pair of lead wires extend in one direction with respect to the thermosensitive element, and extend into the holding member through one side surface of the holding member.

In the temperature sensor of the present invention, it is preferable that the thermosensitive element include a thermosensitive body having a resistance value that changes depending on temperature change, and a pair of lead wires for electrically connecting the thermosensitive body to an external circuit, and that the pair of lead wires extend in both directions with respect to the thermosensitive element, and extend into the holding member through both side surfaces of the holding member.

Further, a temperature detection device of the present invention is characterized by including: the above-described temperature sensor; and a circuit portion electrically connected to the temperature sensor and configured to calculate the temperature of the temperature measurement object based on a signal from the temperature sensor.

Further, an image formation device of the present invention that is an electrophotographic image formation device, the image formation device including: a fixing device configured to fix toner to a recording medium by heating and pressurizing; and the above-described temperature sensor configured to detect the temperature of a member included in the fixing device.

Advantageous Effect of Invention

According to the present invention, since the heat collection member pressurizes the temperature measurement object and the heat collection member is thermally coupled with the thermosensitive element, the heat input to the heat collection member is quickly transferred to the thermosensitive element, due to the heat conduction from the pressurized temperature measurement object. Due to this heat collection action and the heat insulation action of the space that faces the heat collection member, it is possible to keep the heat in the thermosensitive element more sufficiently, and therefore it is possible to realize such a good responsiveness that the detection temperature of the thermosensitive element immediately follows the temperature fluctuation of the temperature measurement object without using the so-called ceramic paper.

DESCRIPTION OF EMBODIMENT

An embodiment (FIG. 1 to FIG. 8) of the present invention will be described below with reference to the accompanying drawings.

[Schematic Configurations of Temperature Detection Device and Temperature Sensor]

Figure 1:
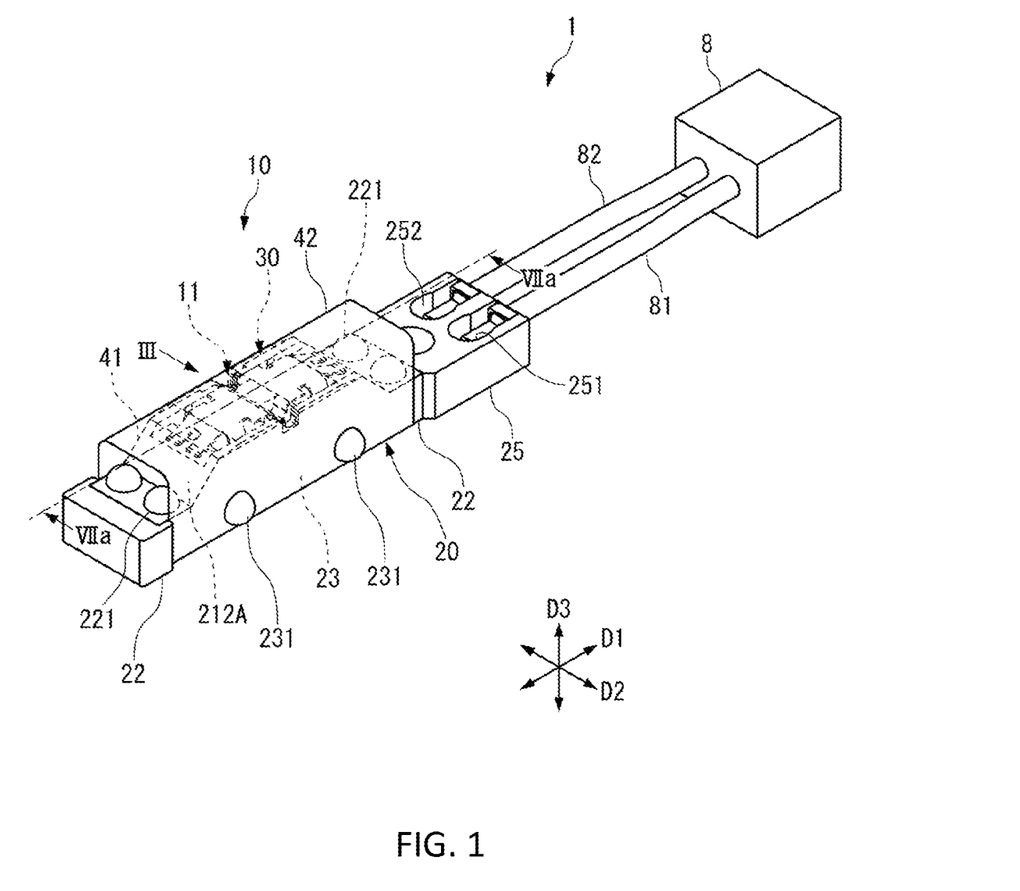
FIG. 1 is a perspective view showing the external appearance of a temperature sensor according to an embodiment of the present invention.

Schematic configurations of a temperature detection device 1 and a temperature sensor 10 of the present invention will be described with reference to FIG. 1 and FIG. 7A. As shown in FIG. 1, the temperature detection device 1 is configured to include the temperature sensor 10, a circuit portion 8, and electric wires 81, 82 for electrically connecting the temperature sensor 10 and the circuit portion 8.

The temperature sensor 10 is disposed at a position facing a temperature measurement object 7 (see FIG. 7A), so as to maintain an abutting state with the temperature measurement object 7. As main constituent elements, the temperature sensor 10 includes a thermosensitive element 11 that detects the temperature of the temperature measurement object 7, a holding member 20, and a plate spring 30 as a heat collection member.

Further, for securing insulation and creepage distance, the temperature sensor 10 includes an inside film 41 (second insulating material) that covers the plate spring 30 and an outside film 42 (first insulating material) that covers the thermosensitive element 11 disposed on the inside film 41. Further, the temperature sensor 10 includes a heat collection material 43 that is encapsulated in the periphery of the thermosensitive element 11 between the inside film 41 and the outside film 42.

The circuit portion 8 calculates the temperature of the temperature measurement object 7, based on an electrical signal that is output from the thermosensitive element 11. The circuit portion 8 is electrically connected to the temperature sensor 10 through the electric wires 81, 82 that are drawn out from the holding member 20.

A direction in which the temperature sensor 10 extends in a direction in which the electric wires 81, 82 are drawn out is referred to as a longitudinal direction D1. A direction orthogonal to the longitudinal direction D1 in planar view is referred to as a width direction D2. A direction orthogonal to both of the longitudinal direction D1 and the width direction D2 is referred to as a height direction D3. The temperature measurement object 7 side in the height direction D3 is referred to as an "upper", and the opposite side is referred to as a "lower".

Further, with respect to the position of the plate spring 30, a front surface side Fs is defined as the temperature measurement object 7 side, and a back surface side Bs is defined as the opposite side (holding member 20 side). In the embodiment, the front surface side Fs corresponds to the upper side, and the back surface side Bs corresponds to the lower side.

Each constituent element of the temperature sensor 10 will be described below.

[Thermosensitive Element]

Figure 2:
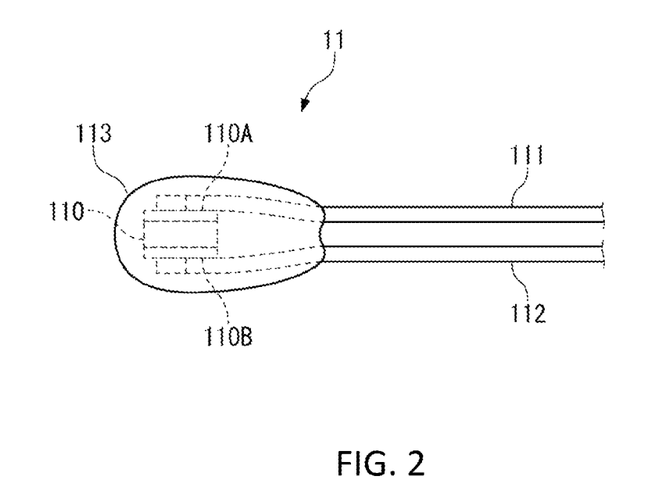
FIG. 2 is a plan view showing a thermosensitive element included in the temperature sensor shown in FIG. 1.
Figure 3:
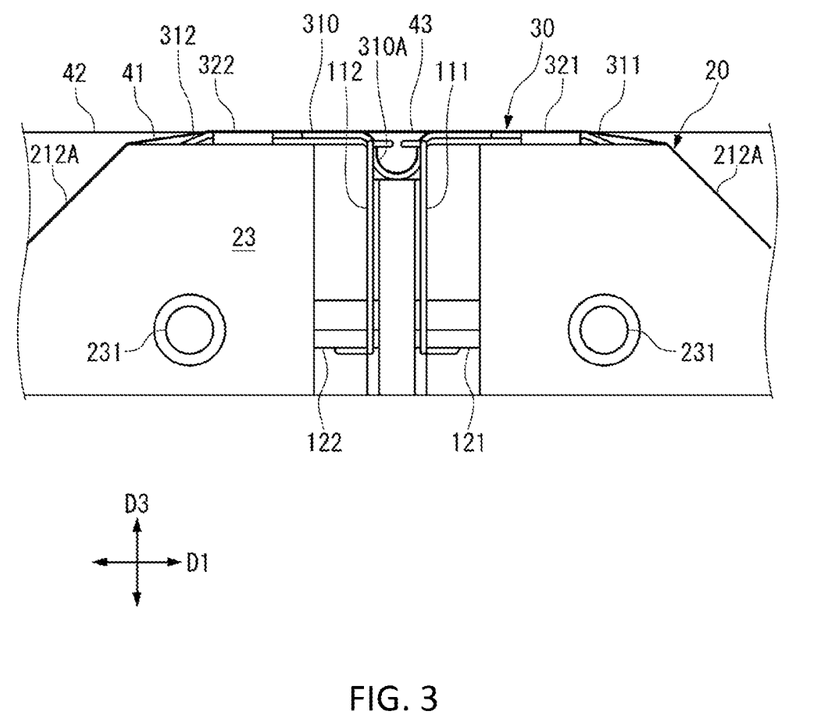
FIG. 3 is a side view showing a holding member and lead wires of the thermosensitive element as viewed in the direction of an arrow III in FIG. 1.

As shown in FIG. 2, the thermosensitive element 11 is a thermistor element that includes a thermosensitive body 110, electrodes 110A, 110B provided in the thermosensitive body 110, a pair of lead wires 111, 112 electrically connected to the electrodes 110A, 110B, and a covering portion 113 covering the thermosensitive body 110. In addition, as the thermosensitive element 11, resistors having temperature coefficients, as exemplified by a thin film thermistor and a platinum temperature sensor, can be widely used.

The lead wires 111, 112 are respectively conducted to the electric wires 81, 82 through a pair of conductive members 121, 122 (FIG. 7A) described later, which are provided in the holding member 20.

The thermosensitive body 110 of the thermosensitive element 11 is disposed so as to face the temperature measurement object 7 (FIG. 7A) through the heat collection material 43 and the outside film 42.

[Holding Member]

The holding member 20 will be described with reference to FIG. 4A and FIG. 4B.

The holding member 20 in the embodiment is formed in a substantially rectangular shape in planar view, and includes a main body portion 22, a seat 201 including a wall body 21 that is formed so as to protrude in the height direction D3 from a nearly central portion of the main body portion 22 in the longitudinal direction D1, and an electric wire connection portion 25 to which the electric wires 81, 82 are connected. A space 20S surrounded by the wall body 21 and having a rectangular parallelepiped shape is formed on the inside of the seat 201. The plate spring 30 described later is arranged on the front surface side Fs (the upper side in the height direction D3) of the space 20S.

The holding member 20 may be formed in a square shape or a circular shape in planar view, depending on the shape of the space 20S, the disposition of bosses 221, 231 described later, and the like.

The holding member 20 is integrally formed by injection molding, using an insulating resin material. For example, an upper surface 22a of the main body portion 22 and an upper surface 25a of the electric wire connection portion 25 exist on an identical plane. Moreover, a plurality of first bosses 221 formed so as to protrude in the height direction D3 are provided on the upper surface 22a of the main body portion 22, and a plurality of second bosses 231 formed so as to protrude in the width direction D2 are provided on a side surface 23 of the main body portion 22. The first bosses 221 and the second bosses 231 are used for attaching the films 41, 42 to the holding member 20.

The electric wire connection portion 25 is a site for attaching the electric wires 81, 82 for electrically connecting the thermosensitive element 11 and the circuit portion 8, and is formed integrally with the main body portion 22 at one end portion of the main body portion 22 in the longitudinal direction D1. Connection holes 251, 252 for respectively connecting the electric wires 81, 82 to the conductive members 121, 122 described later are formed on the electric wire connection portion 25.

The seat 201 is a site for attaching the plate spring 30, and is formed in a rectangular shape in planar view. The seat 201 is constituted by the wall body 21 and the space 20S.

The wall body 21 includes a pair of first walls 211, 211 that extend in the longitudinal direction D1 and that face each other in the width direction D2, and second walls 212, 212 that connect the respective both ends of the first walls 211, 211 in the longitudinal direction D1. Each of the first walls 211, 211 and the second walls 212, 212 is formed so as to stand in the height direction D3 from a bottom portion 213 of the seat 201, and upper ends of the first walls 211, 211 and the second walls 212, 212 form an opening 210 having a rectangular shape. Cutouts 211A, 211A formed so as to be cut in a concave shape are respectively formed at the centers of the first walls 211, 211 in the longitudinal direction D1. Moreover, positioning pieces 321 to 324 (FIG. 6) each of which is a part of the plate spring 30 are inserted into the space 20S through the opening 210.

The space 20S maintains heat in the thermosensitive element 11, due to the heat insulation action that restrains the heat conduction from the thermosensitive element 11 to the exterior. Thereby, the resistance value of the thermosensitive element 11 is quickly changed in response to the temperature fluctuation of the temperature measurement object 7 that inputs heat to the thermosensitive element 11, and the responsiveness of the temperature sensor 10 is enhanced. Cross-sectional areas (areas in the directions D1 and D2) and a thickness (a size in the direction D3) that realize a necessary thermal resistance are given to the space 20S.

For keeping the heat conductivity of the space 20S as low as possible, it is preferable that substances other than air be not disposed in the space 20S. The existence of substances such as gas and liquid other than air is not entirely excluded in the space 20S, and substances other than air is not avoided from being encapsulated into the space 20S, as long as a low heat conductivity can be maintained. Further, it is allowable to dispose a member having a plate shape or the like in the space 20S, for restraining the generation of a convective flow in the space 20S. The space 20S may be formed in another shape, for example, in a cylindrical shape.

Support portions 214 supporting the plate spring 30 are formed on an upper end (distal end) of the second wall 212. The support portions 214 are formed so as to be flat, and the height of the support portions 214 is set so as to be lower than the height of the upper end of the first wall 211.

Outer surfaces 212A of the pair of the second walls 212 are inclined in such directions that the outer surfaces 212A come close to each other upward. Therefore, the holding member 20 is formed in a frustum shape in side view.

Element support portions 215 supporting the thermosensitive element 11 through the plate spring 30, first contact protrusions 216 and second contact protrusions 217 are formed on the inside of the wall body 21.

The element support portions 215 are formed so as to respectively protrude to the inside in the width direction D2 from positions where the cutouts 211A, 211A of the pair of the first walls 211 are formed. Upper end surfaces of the element support portions 215 are continuous with bottom surfaces of the cutouts 211A formed on the first walls 211. Each element support portion 215 is positioned at the center of the space 20S in the longitudinal direction D1, and supports the plate spring 30 at a position corresponding to the thermosensitive body 110.

The first contact protrusion 216 (FIG. 4A and FIG. 4B) is formed at two spots on both sides of the element support portions 215 of each of the pair of the first walls 211. The respective first contact protrusions 216 protrude from the first walls 211, and distal ends of the first contact protrusions 216 contact with surfaces of the positioning pieces 321 to 324 of the heat collection member 30. Further, the second contact protrusions 217 are formed at four corners of the bottom portion 213 in the vicinity of the first contact protrusions 216, and distal ends of the second contact protrusions 217 contact with side surfaces of the positioning pieces 321 to 324. With the first contact protrusions 216 and the second contact protrusions 217, the positioning of the plate spring 30 in the longitudinal direction D1 and the width direction D2 is performed, and the plate spring 30 is maintained in a state of being away from the wall body 21 as much as possible.

Figure 4A:
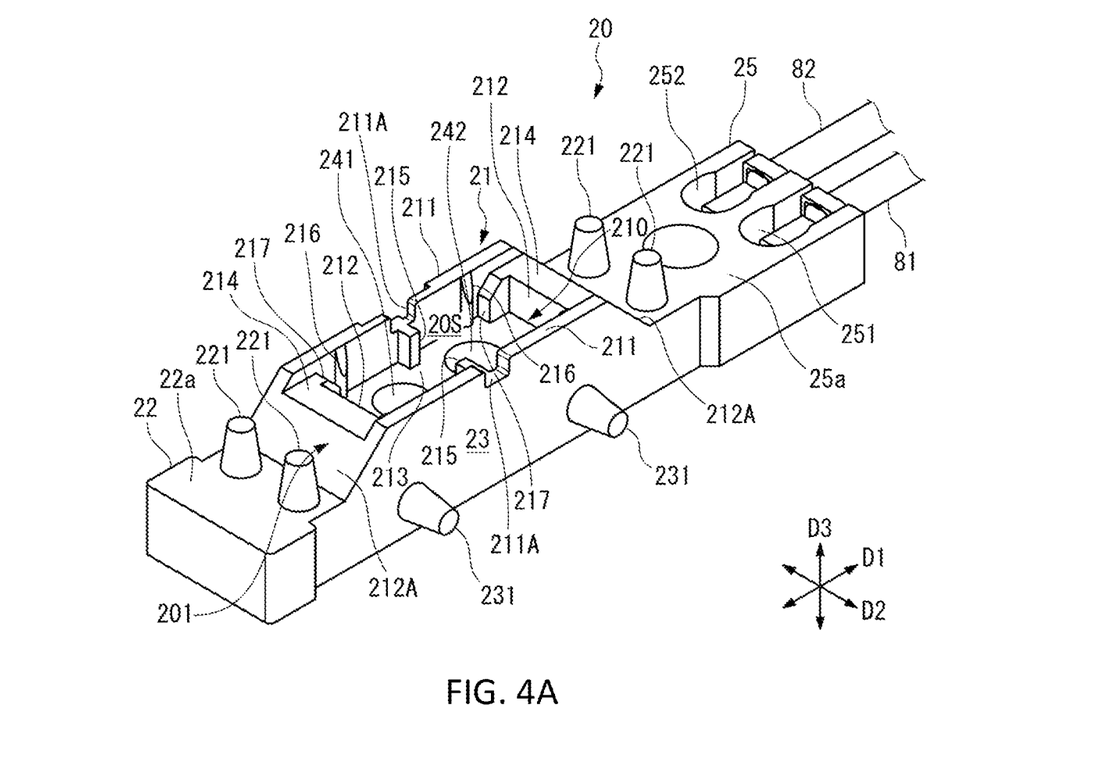
FIG. 4A is a perspective view showing the holding member.
Figure 4B:
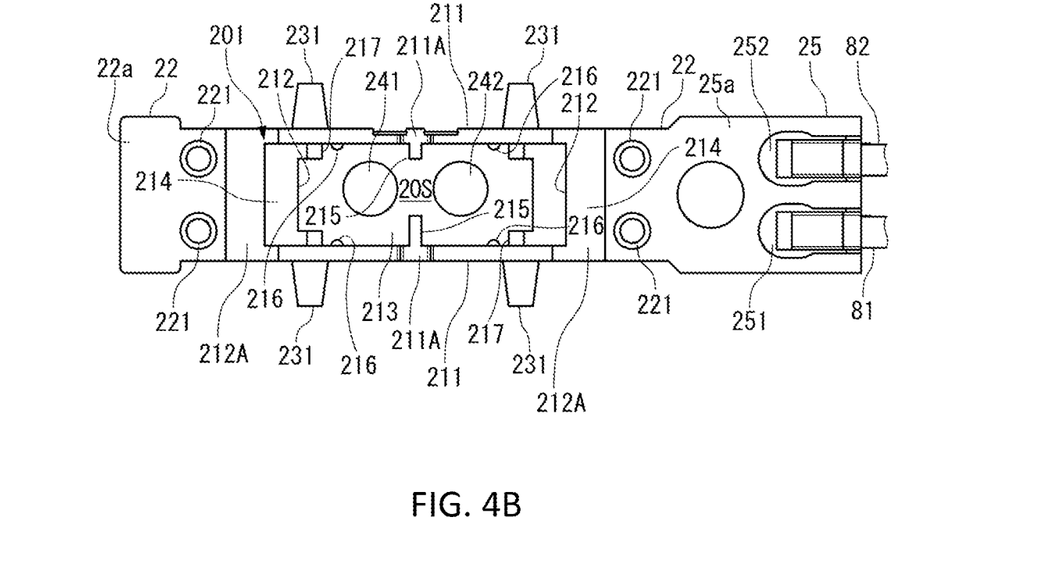
FIG. 4B is a plan view showing the holding member.

As shown in FIG. 4B, the first contact protrusions 216 are formed so as to protrude from the first walls 211 in a circular arc shape. Further, upper ends of the first contact protrusions 216 have a taper shape for guiding the positioning pieces 321 to 324 at the time of the insertion of the plate spring 30. The height of the first contact protrusions 216 is set so as to be lower at a distal end side than at a proximal end on the first wall 211 side. Similarly, upper ends of the second contact protrusions 217 are formed in a taper shape.

By adopting the shapes of the first contact protrusions 216 and the second contact protrusions 217, the contact area between the holding member 20 and the plate spring 30 is reduced, and therefore it is hard for heat to escape from the thermosensitive element 11 to the holding member 20 through the plate spring 30.

Figure 7A:
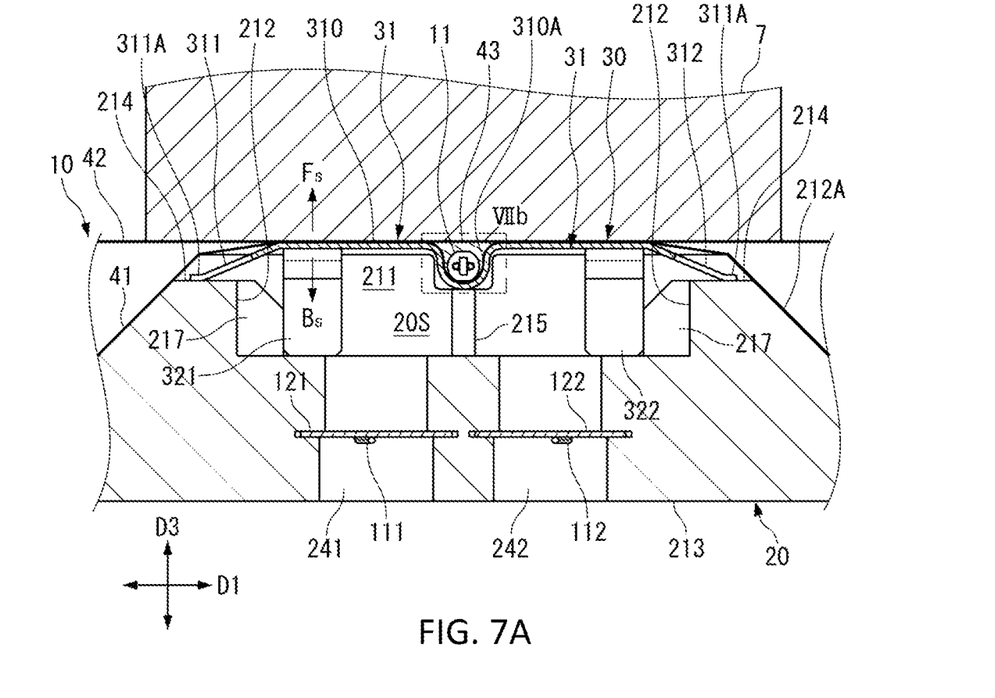
FIG. 7A is a sectional view taken along a VIIa-VIIa line in FIG. 1.

As shown in FIG. 7A, the conductive members 121, 122 having a plate shape are provided in the bottom portion 213 of the seat 201. The insert molding can be performed while the conductive members 121, 122 are disposed in a mold for the injection molding of the holding member 20. Connection holes 241, 242 are formed so as to penetrate the bottom portion 213 in the height direction D3. The conductive members 121, 122 are disposed so as to protrude to the insides of the connection holes 241, 242. The lead wires 111, 112 (FIG. 3) extend to one side of the plate spring 30 in the width direction D2, and extend to the inside of the bottom portion 213 through the side surface 23 of the holding member 20.

The first bosses 221 and the second bosses 231 are formed integrally with the holding member 20.

The first bosses 221 are disposed on the upper surface of the main body portion 22 such that two first bosses 221 face two first bosses 221 in the longitudinal direction D1 through the seat 201, and the second bosses 231 are disposed such that two second bosses 231 are disposed on each of both side surfaces 23 of the holding member 20. This is an example, and the first bosses 221 and the second bosses 231 can be formed at appropriate positions of the holding member 20.

[Plate Spring (Heat Collection Member)]

The plate spring 30 (FIG. 5A to FIG. 7B) pressurizes the temperature measurement object 7 from the back surface side Bs by elastic force, and is thermally coupled with the thermosensitive element 11.

For quickly transferring the heat from the temperature measurement object 7 to the thermosensitive element 11, the plate spring 30 can be integrally formed using a metal material generally having a higher heat conductivity than resin material and the like, or another material having a heat conductivity that is comparable to the heat conductivity of the metal material, for example, using a metal material such as a copper alloy and stainless steel, a material containing carbon, or the like. In the case where the metal material is used, the plate spring 30 can be formed by press working such as punching and bending. The material that is used for the plate spring 30 can be appropriately selected in consideration of heat conductivity, spring property and heat resistance property.

It is preferable that the plate thickness of the plate spring 30 be as small as possible, as long as the strength can be secured, for avoiding the decrease in responsiveness due to the increase in heat capacity. For example, the plate thickness of the plate spring 30 is about 0.05 to 0.2 mm.

Due to not only the heat insulation action of the above-described space 20S but also the heat collection action of the plate spring 30, it is possible to quickly change the resistance value of the thermosensitive element 11 in response to the temperature fluctuation of the temperature measurement object 7, and to further enhance the responsiveness of the temperature sensor 10. The "heat collection" in the specification means that the heat input from the temperature measurement object 7 is quickly transferred to the thermosensitive element 11. With this heat collection action of the plate spring 30, the heat is maintained in the thermosensitive element 11 and the vicinity of the thermosensitive element 11.

Figure 6A:
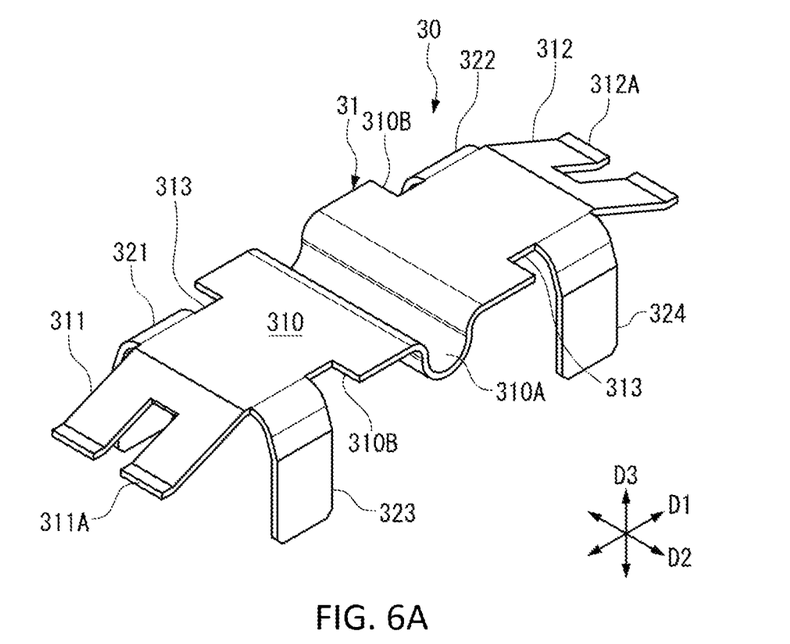
FIG. 6A is a perspective view showing the plate spring as a heat collection member.
Figure 6B:
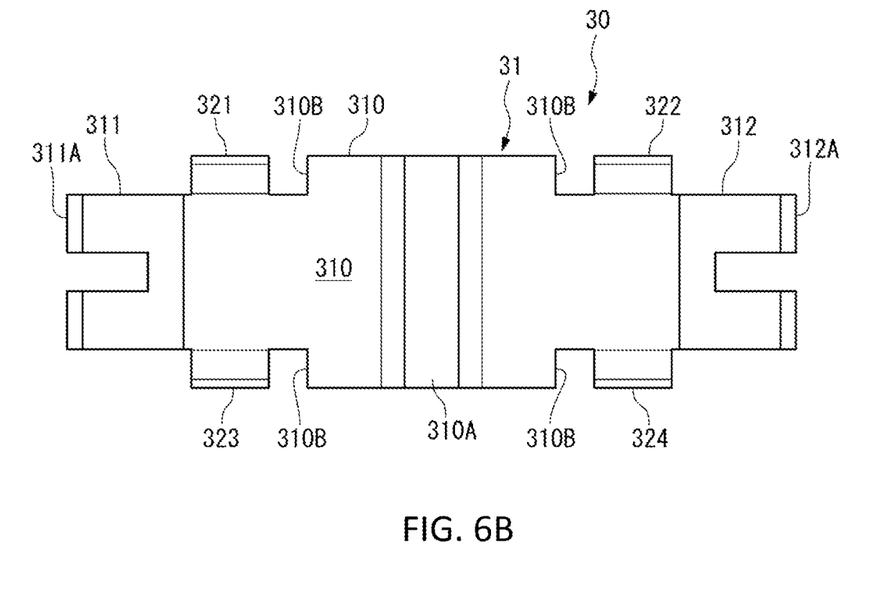
FIG. 6B is a plan view showing the plate spring as a heat collection member.

The plate spring 30 includes a main body portion 31 on which the thermosensitive element 11 is disposed and the plurality of positioning pieces 321 to 324 for the positioning of the plate spring 30 on the holding member 20.

The main body portion 31 is formed in a substantially rectangular shape in planar view. The main body portion 31 includes an abutting portion 310 that is pressed against the temperature measurement object 7, and spring pieces 311, 312 as a pair of leg portions that form both end portions of the abutting portion 310 in the longitudinal direction D1.

A groove 310A as an element disposition portion where the thermosensitive body 110 and parts of the lead wires 111, 112 are disposed is provided on the abutting portion 310. The groove 310A extends in the short direction (width direction D2) of the main body portion 31 and is bent in an out-of-plane direction of the main body portion 31 to form a concave shape. The groove 310A is formed from one end of the abutting portion 310 to the other end of the abutting portion 310 in the width direction D2.

The groove 310A is set so as to have a width (the size in the longitudinal direction D1) and a depth that allow the thermosensitive body 110 to be accommodated even when the sizing of the thermosensitive body 110 varies due to tolerance.

When heat is sufficiently input from the temperature measurement object 7 to the lead wires 111, 112 (particularly, Dumet wires in the vicinity of the thermosensitive body 110) having a higher heat conductivity than the thermosensitive body 110, the responsiveness can be enhanced, and therefore it is preferable that sections of the lead wires 111, 112 that are disposed in the groove 310A be as long as possible, in consideration of the position where the thermosensitive body 110 of the thermosensitive element 11 is disposed. For example, the thermosensitive body 110 is disposed so as to be shifted to the outside of the center in the width direction D2 of the groove 310A formed on the plate spring 30, and thereby it is possible to elongate the sections of the lead wires 111, 112 that are disposed in the groove 310A.

The abutting portion 310 is formed so as to be substantially flat except the groove 310A, and the whole in the length direction D1 is pressed against the temperature measurement object 7.

In order to avoid the abutting portion 310 supported by the spring pieces 311, 312 at both ends from warping between both ends due to reaction force from the temperature measurement object, thereby causing the thermosensitive element 11 to move away from the temperature measurement object 7, the abutting portion 310 is supported at the position of the groove 310A by the element support portion 215 of the holding member 20.

Instead of the groove 310A, a concave portion having the same shape as the outer shape of the thermosensitive body 110 may be formed on the abutting portion 310.

The spring pieces 311, 312 protrude from the abutting portion 310 to both sides in the longitudinal direction D1, and are bent so as to be inclined downward with respect to the surface of the abutting portion 310, and the respective distal ends 311A, 312A are bent in the surface direction of the abutting portion 310 so as to perform surface contact with the support portions 214. Between the pair of first walls 211 of the holding member 20, the spring pieces 311, 312 are respectively supported by the support portions 214 formed at positions lower than the first walls 211. Therefore, when the abutting portion 310 is pressed against the temperature measurement object 7 and the spring pieces 311, 312 are displaced on the support portions 214, the spring pieces 311, 312 elastically deform without interfering with the second walls 212, and therefore it is possible to sufficiently pressurize the temperature measurement object 7, as the plate spring 30.

The respective distal ends 311A, 312A of the spring pieces 311, 312 are formed so as to be bent and to perform surface contact with the support portions 214, and therefore, when the spring pieces 311, 312 slide on the support portions 214, it is hard for the spring pieces 311, 312 to damage the holding member 20.

It is preferable that the contact area between the plate spring 30 and the holding member 20 be as small as possible. This is because heat escapes to the holding member 20 through the portion of the contact. Therefore, the spring pieces 311, 312 of the plate spring 30 in the embodiment are formed in a biforked shape for decreasing the contact area with the support portions 214.

The positioning pieces 321 to 324 are formed on both sides of the abutting portion 310 in the width direction D2. The positioning pieces 321 to 324 are respectively provided close to four corners of the abutting portion 310, and are formed so as to protrude downward by bending the abutting portion 310 in the thickness direction D3. The positioning pieces 321 to 324 communicate with portions 313 of the abutting portion 310 where the width is decreased. In the abutting portion 310, the width is decreased from steps 310B, on both sides of the groove 310A in the longitudinal direction D1.

When the positioning pieces 321 to 324 are inserted into the space 20S, the positioning is performed on the holding member 20 by the above-described first contact protrusions 216 and second contact protrusions 217.

When the temperature sensor 10 is pressed against the temperature measurement object 7 (FIG. 7A), the abutting portion 310 performs surface contact with the temperature measurement object 7, and the plate spring 30 is pressed by the temperature measurement object 7. Then, the spring pieces 311, 312 of the plate spring 30 elastically deform while being displaced on the support portions 214 to the outsides in the longitudinal direction D1 orthogonal to the pressing direction (D3). At this time, the main body portion 31 is pressurized to the temperature measurement object 7 by the elastic force of the spring pieces 311, 312.

[Inside Film]

The inside film 41 is provided on the holding member 20, for insulating the plate spring 30 and the thermosensitive element 11.

Figure 7B:
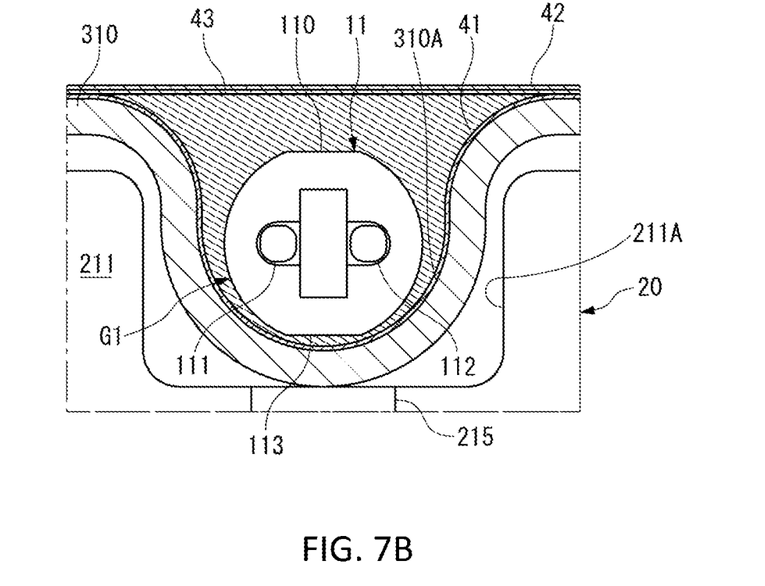
FIG. 7B is an enlarged view of a VIIb portion in FIG. 7A.
Figure 8:
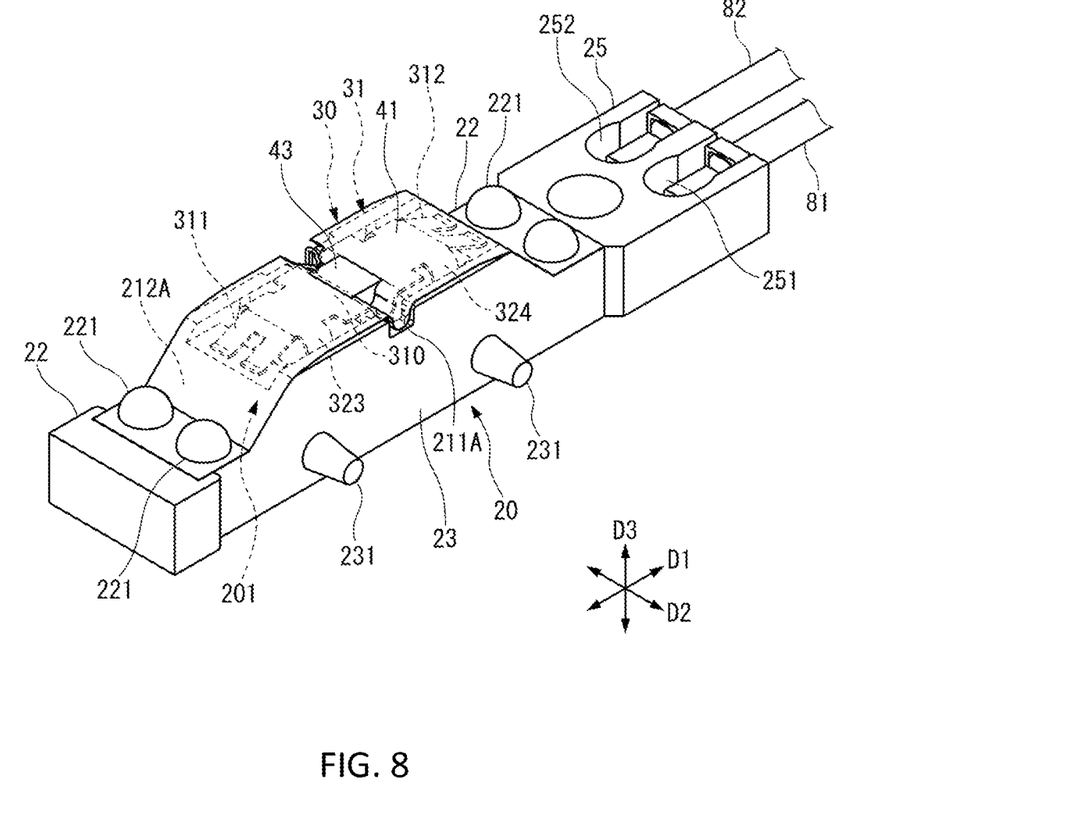
FIG. 8 is a perspective view showing a state where a film on the inside is provided in the holding member.

The inside film 41, which has insulation property, is inserted into the inside of the groove 310A, and is interposed between the plate spring 30 and the thermosensitive element 11, as shown in FIG. 7B and FIG. 8. In addition, for sufficiently securing the creepage distance from the thermosensitive element 11, the inside film 41 covers the whole of the surface of the plate spring 30 from the temperature measurement object 7 side.

For the inside film 41, for example, a resin material such as polyimide and a fluorocarbon resin is used. For example, the thickness of the inside film 41 is about 10 to 20 µm.

The inside film 41 has a width equivalent to the width of the seat 201, and is formed in a rectangular shape.

In the case where insulating coatings are provided on the lead wires 111, 112, the inside film 41 is not always necessary even when the plate spring 30 has conductive property. Similarly, in the case where the plate spring 30 is a member having no conductive property, as exemplified by a resin molded article, it is possible to omit the arrangement of the inside film 41.

Moreover, the plate spring 30 and the thermosensitive element 11 are thermally coupled through the inside film 41.

[Heat Collection Material]

For collecting heat in the thermosensitive element 11, it is preferable that a gap G1 (FIG. 7B) in the periphery of the thermosensitive element 11 disposed in the groove 310A be filled with the insulating heat collection material 43 (FIG. 7B and FIG. 8) that is thermally coupled with the thermosensitive element 11.

As the heat collection material 43, for example, a material containing a disperse medium such as a silicone resin that has a high heat conductivity among resin materials, and an insulating dispersoid such as a ceramic powder is used. Further, as the heat collection material 43, a so-called heat conductive grease or silicone oil compound can be used.

The filling with the heat collection material 43 is performed on the inside film 41.

The heat collection material 43 tightly contacts with the thermosensitive element 11 and tightly contacts with the plate spring 30 through the inside film 41, and thereby it is possible to thermally couple the plate spring 30 with the thermosensitive element 11 more sufficiently, and to further enhance the responsiveness.

[Outside Film]

The outside film 42 has insulation property, and is provided for insulating the thermosensitive element 11 and the temperature measurement object 7 by covering the plate spring 30 and the holding member 20 from the temperature measurement object 7 side while being interposed between the thermosensitive element 11 and the temperature measurement object 7. Further, the outside film 42 holds the thermosensitive element 11 on the plate spring 30. As shown in FIG. 1 and FIG. 7A, the outside film 42 covers the thermosensitive element 11 on the inside film 41, and is fixed to both side surfaces 23 of the holding member 20. Furthermore, for sufficiently securing the creepage distance from the thermosensitive element 11 and the conductive members 121, 122, the outside film 42 covers most of the holding member 20 that includes both side surfaces 23 of the holding member 20, in addition to the whole of the plate spring 30.

For the outside film 42, for example, a resin material such as polyimide and a fluorocarbon resin is used. As shown in FIG. 7B, the outside film 42 may be a film in which two or more film materials are laminated. For example, the whole thickness of the outside film 42 is about 10 to 20 µm.

[Assembly Procedure for Temperature Sensor]

For example, the temperature sensor 10 can be assembled in the following procedure.

Each procedure will be described.

(1) Terminals of the lead wires 111, 112 of the thermosensitive element 11 are joined to the conductive members 121, 122 (FIG. 7A) in a state where the insert molding has been performed in the holding member 20, by electric welding or the like.

(2) The positioning pieces 321 to 324 of the plate spring 30 are inserted into the inside of the wall body 21 of the holding member 20 shown in FIG. 4A and FIG. 4B. At this time, distal ends (lower ends) of the positioning pieces 321 to 324 do not contact with the bottom portion 213. When the plate spring 30 is further pushed to the inside of the wall body 21, the distal ends of the positioning pieces 321 to 324 come in contact with the bottom portion 213, and the positioning pieces 321 to 324 function as a stopper at this time.

Figure 5A:
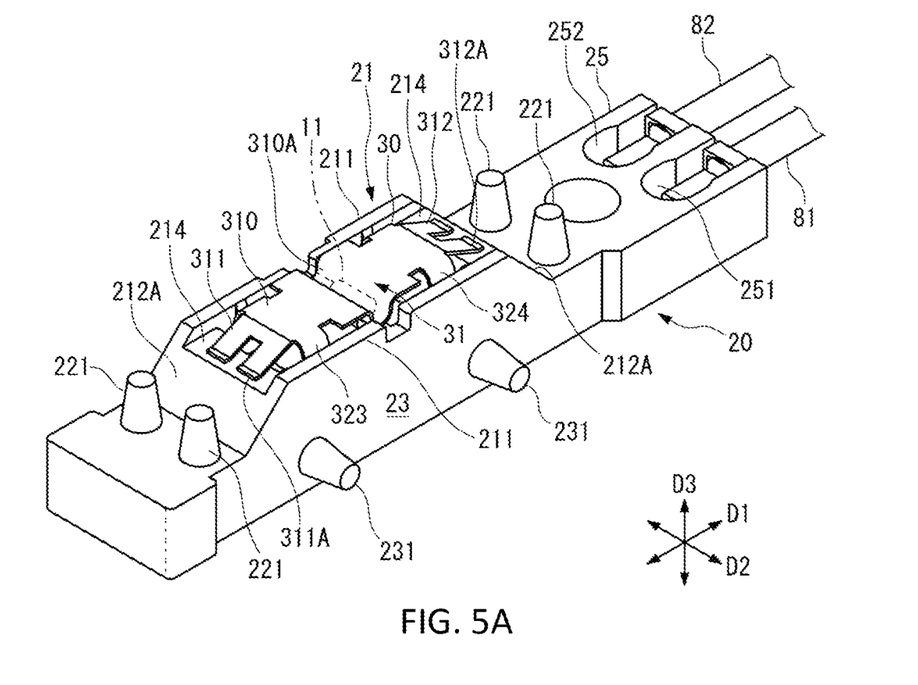
FIG. 5A is a perspective view showing the holding member and a plate spring, two-dot chain lines showing the thermosensitive element.
Figure 5B:
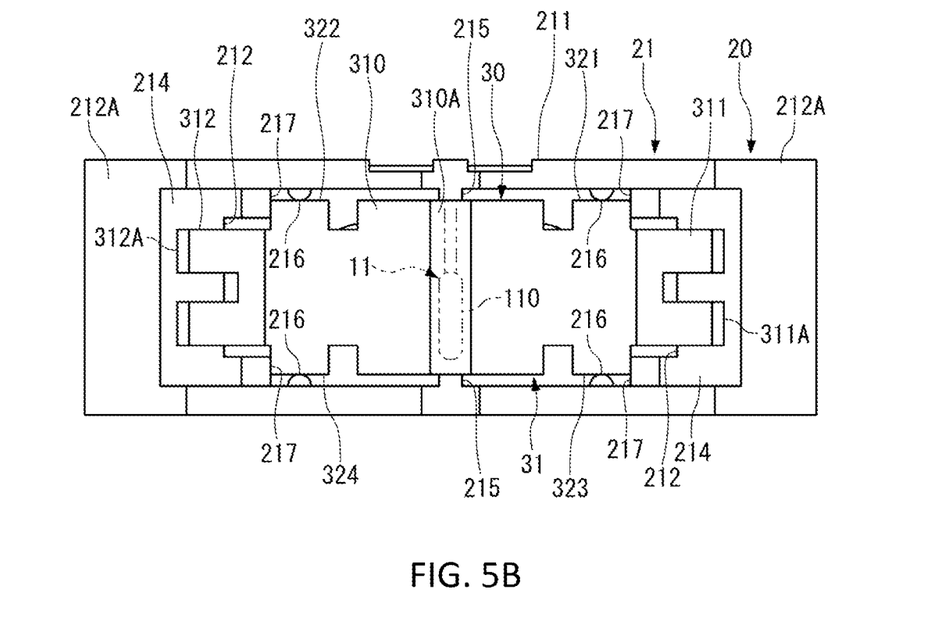
FIG. 5B is a plan view showing the holding member and a plate spring, two-dot chain lines showing the thermosensitive element.

As shown in FIG. 5A, the plate spring 30 is assembled to the holding member 20 in a state where the spring pieces 311, 312 are supported by the support portions 214. At this time, the abutting portion 310 protrudes upward of the upper ends of the first walls 211. The space 20S is defined on the back surface side Bs of the plate spring 30.

(3) Next, as shown in FIG. 8, the plate spring 30 is covered by the inside film 41, and the inside film 41 is fixed to the holding member 20 by a heat caulking in which heat and pressure are applied to the first bosses 221 that are inserted into holes provided at four corners of the inside film 41.

(4) The lead wires 111, 112 are routed while being shaped, and the thermosensitive element 11 is assembled to the holding member 20 and the plate spring 30. Specifically, the lead wires 111, 112 are bent upward along the side surfaces 23 of the holding member 20 from the conductive members 121, 122, and thereafter are also bent at the position of the groove 310A of the plate spring 30. Then, the thermosensitive body 110 is accommodated in the groove 310A on which the inside film 41 is laid.

(5) Subsequently, the heat collection material 43 is applied to the thermosensitive body 110. The heat collection material 43 adheres to the thermosensitive body 110 and the lead wires 111, 112 drawn out from the thermosensitive body 110.

(6) Finally, as shown in FIG. 1, most of the holding member 20 that includes the thermosensitive element 11 and the heat collection material 43 is covered by the outside film 42, and the outside film 42 is fixed to the holding member 20 by the heat caulking of the second bosses 231, similarly to the first bosses 221.

Thereby, the assembly of the temperature sensor 10 is completed.

[Main Function Effect of Temperature Sensor]

When the temperature sensor 10 is installed so as to face the temperature measurement object 7 (FIG. 7A), the abutting portion 310 of the plate spring 30 is pressed against the temperature measurement object 7, and thereby the spring pieces 311, 312 elastically deform while smoothly sliding on the support portions 214. As a result, the abutting portion 310 supported by the element support portions 215 is evenly pressurized to the temperature measurement object 7 through the inside film 41 and the outside film 42. Furthermore, the heat radiated from the temperature measurement object 7 is sufficiently input to the abutting portion 310 pressed against the temperature measurement object 7, and the heat is sufficiently transferred from the abutting portion 310 to the thermosensitive element 11 through the heat collection material 43 supplied to the inside of the groove 310A. At this time, the abutting portion 310 is thermally coupled with not only the thermosensitive element 11 but also the temperature measurement object 7.

Even when void remains between the thermosensitive element 11 and the abutting portion 310 at the time of the completion of the assembly of the temperature sensor 10, the thermosensitive body 110 and the vicinity of the thermosensitive body 110 are filled with the heat collection material 43 substantially with no gap, by the pressurization from the plate spring 30 to the temperature measurement object 7. Therefore, it is possible to thermally couple the thermosensitive element 11 and the plate spring 30 more sufficiently.

Furthermore, the positioning pieces 321 to 324 and spring pieces 311, 312 of the plate spring 30 contact with the holding member 20 by the minimum necessary contact, and therefore the outflow of the heat to the holding member 20 through the plate spring 30 is restrained. By the synergy of this, the heat collection action of the plate spring 30, and further the heat insulation action of the space 20S having a lower heat conductivity than a heat insulating material such as a ceramic paper, it is possible to more surely keep the heat transferred from the temperature measurement object 7 in the thermosensitive element 11 and the vicinity of the thermosensitive element 11.

Accordingly, with the temperature sensor 10 in the embodiment, it is possible to cause the thermosensitive element 11 to immediately follow the temperature change of the temperature measurement object 7, and to realize a good responsiveness of the detection temperature. Due to the thin plate spring 30 and the space 20S defined on the back surface side Bs, the temperature sensor 10 has both the heat insulation performance and the elastic force for pressurizing the temperature sensor 10 to the temperature measurement object 7, and therefore without using the so-called ceramic paper, it is possible to realize a responsiveness equal to or higher than that of the ceramic paper, while maintaining the small size of the temperature sensor 10.

[Application Example for Image Formation Device]

An example in which the temperature detection device 1 including the temperature sensor 10 is applied to the laser printer 9 as an example of the image formation device will be briefly described with reference to FIG. 9.

Figure 9:
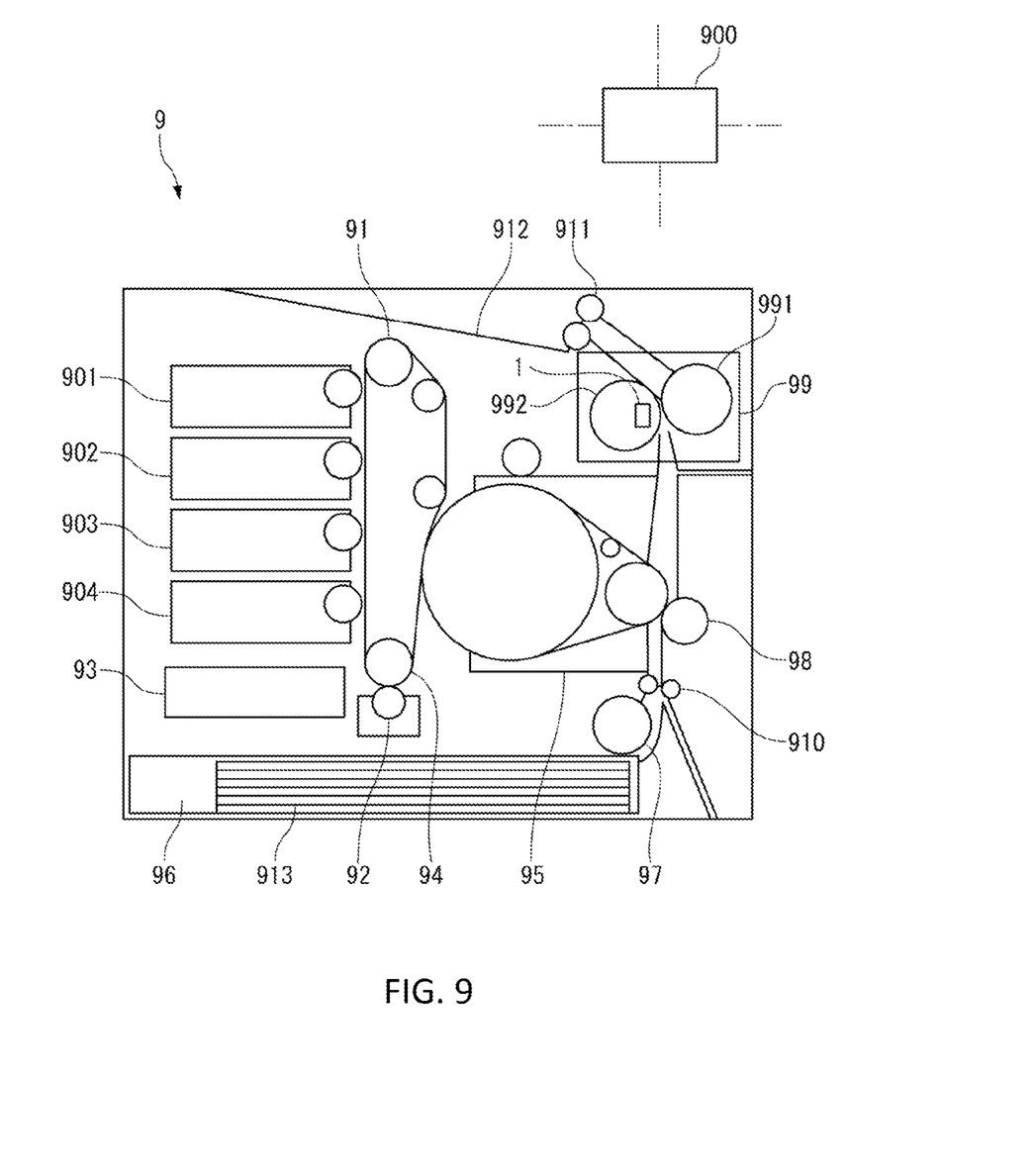
FIG. 9 is a schematic view showing an internal structure of a printer equipped with the temperature sensor shown in FIG. 1.

As shown in FIG. 9, the laser printer 9 includes a photoreceptor belt 91, an electrifier 92, an exposure device 93, developing devices 901 to 904, a guide roller 94, an intermediate transfer unit 95, a paper feed cassette 96, a paper feed roller 97, a transfer roller 98, a fixing device 99, a resist roller 910, a paper ejection roller 911, a paper ejection tray 912, and a control device 900 that controls each unit of the laser printer 9.

The fixing device 99 includes a pressure roller 991 and a heating roller 992. The heating roller 992 incorporates an unillustrated heater as a heat source.

For measuring the temperature of the heater incorporated in the heating roller 992 and the temperature of a member provided on the heater, the temperature sensor 10 is installed so as to be pressed against the heater or the member.

After electrification, exposure, development and transfer as processes of the image formation by the laser printer 9, a recording paper 913 on which a color toner image is transferred is fed to between the pressure roller 991 and heating roller 992 of the fixing device 99, in the process of fixation. The recording paper 913 is pressurized and heated while passing through between the pressure roller 991 and the heating roller 992, and thereby the color toner image is fixed to the recording paper 913. Thereafter, the recording paper 913 is ejected to the paper ejection tray 912 through the paper ejection roller 911.

The control device 900 controls the energization state of the heater of the heating roller 992, using the temperature measurement value obtained from the temperature sensor 10 and the circuit portion 8 to which the temperature sensor 10 is connected. For example, when the temperature measurement value exceeds a threshold, the control device 900 stops the energization of the heater of the heating roller 992.

With the temperature sensor 10, the surface temperature of the heating roller 992 is measured at a high following capability, and therefore, it is possible to adequately control the energization state of the heater without needlessly heating the heating roller 992 with the heater in prospect of the delay of the response of the measurement.

In addition to the above description, configurations described in the above embodiment can be chosen, or can be appropriately altered to other configurations, without departing from the spirit of the present invention.

The case of using the thermistor element having a configuration in which the lead wires 111, 112 extend from one side of the thermosensitive body 110 in one direction as shown in FIG. 2 has been exemplified and described in the above embodiment, but a thermistor element in which the lead wires 111, 112 extend in both directions of the thermosensitive body 110 may be used. In this case, the lead wires 111, 112 pass through both side surfaces 23 of the holding member 20, and extend into the holding member 20.

Further, the case where the lead wires 111, 112 are drawn out from the thermosensitive body 110 in the width direction D2 has been exemplified and described in the embodiment, but the lead wires 111, 112 may be drawn out from the thermosensitive body 110 in the longitudinal direction D1.

The shape of the plate spring 30 is not limited to the above embodiment, and various modifications can be made.

For example, a protrusion for performing the positioning of the plate spring 30 on the holding member 20 can be formed between portions of the biforked shape of each of the spring pieces 311, 312. In that case, the positioning pieces 321 to 324 extending downward from the abutting portion 310 is not necessary.

REFERENCE SIGNS LIST 1 temperature detection device
7 temperature measurement object
8 circuit portion
9 laser printer
10 temperature sensor
11 thermosensitive element
20 holding member
20s space
21 wall body
22 main body portion
23 side surface
25 electric wire connection portion
30 plate spring (heat collection member)
31 main body portion
41 inside film (second insulating material)
42 outside film (first insulating material)
43 heat collection material
81, 82 electric wire
91 photoreceptor belt
92 electrifier
93 exposure device
94 guide roller
95 intermediate transfer unit
96 paper feed cassette
97 paper feed roller
98 transfer roller
99 fixing device
110 thermosensitive body
111, 112 lead wire
113 covering portion
121, 122 conductive member
201 seat
210 opening
211 first wall
211A cutout
212 second wall
212A outer surface
213 bottom portion
214 support portion
215 element support portion
216 first contact protrusion (contact protrusion)
217 second contact protrusion (contact protrusion)
221 first boss
231 second boss
241, 242 connection hole
251, 252 connection hole
310 abutting portion
310A groove (element disposition portion)
310B step
311, 312 spring piece (leg portion)
311A, 312A distal end
321 to 324 positioning piece
900 control device
901 to 904 developing device
910 resist roller
911 paper ejection roller
912 paper ejection tray
913 recording paper (recording medium)
991 pressure roller
992 heating roller
Bs back surface side
Fs front surface side
D1 longitudinal direction
D2 width direction
D3 height direction
G1 gap

The invention claimed is:

1. A temperature sensor that is disposed so as to maintain an abutting state with a temperature measurement object, the temperature sensor comprising:
a thermosensitive element configured to detect a temperature of the temperature measurement object;
a heat collection member configured to pressurize the temperature measurement object and to be thermally coupled with the thermosensitive element; and
a holding member supporting the heat collection member and forming a space that faces the heat collection member, wherein the heat collection member is a plate spring.

2. The temperature sensor according to claim 1, wherein:
the heat collection member includes a main body portion where the thermosensitive element is disposed; and
an end portion of the main body portion is supported by the holding member, and the main body portion is pressurized to a temperature measurement object side by elastic force.

3. The temperature sensor according to claim 2, wherein:
the heat collection member includes a pair of leg portions supported by the holding member, at both end portions of the main body portion; and
the main body portion is pressurized to the temperature measurement object side by the elastic force of the leg portions.

4. The temperature sensor according to claim 2, wherein an element disposition portion for disposing the thermosensitive element is formed at the main body portion.

5. The temperature sensor according to claim 4, wherein the holding member includes an element support portion supporting the thermosensitive element through the element disposition portion.

6. The temperature sensor according to claim 4, wherein:
the element disposition portion is formed in a concave shape at a part of the main body portion; and
the thermosensitive element is accommodated in the element disposition portion.

7. The temperature sensor according to claim 6, wherein:
the main body portion is formed in a substantially rectangular shape in planar view, and is supported by the holding member, at leg portions included in both end portions in a longitudinal direction; and
the element disposition portion is formed so as to extend in a short direction of the main body portion and to bend in an out-of-plane direction of the main body portion.

8. The temperature sensor according to claim 1, wherein the heat collection member includes a plurality of positioning pieces that are inserted into the space.

9. The temperature sensor according to claim 8, wherein:
the holding member includes a wall body forming the space; and
a contact protrusion protruding from the wall body and contacting with the positioning pieces is formed on the wall body.

10. The temperature sensor according to claim 1, wherein:
the holding member includes a wall body forming the space;
the heat collection member is supported by a distal end of a part of the wall body; and
the wall body has a lower height at a position where the heat collection member is supported, than a height at the other position.

11. The temperature sensor according to claim 1, wherein a first insulating material covering the heat collection member from a temperature measurement object side is disposed between the thermosensitive element and the temperature measurement object.

12. The temperature sensor according to claim 11, wherein
the first insulating material is formed in a film shape.

13. The temperature sensor according to claim 1, wherein:
the thermosensitive element includes a thermosensitive body having a resistance value that changes depending on temperature change, and a lead wire for electrically connecting the thermosensitive body to an external circuit; and
a second insulating material configured to insulate at least the lead wire of the thermosensitive element and the heat collection member is disposed between the thermosensitive element and the heat collection member.

14. The temperature sensor according to claim 13, wherein
the second insulating material is formed in a film shape, and covers the heat collection member from a temperature measurement object side.

15. The temperature sensor according to claim 1, wherein:
the thermosensitive element includes a thermosensitive body having a resistance value that changes depending on temperature change, and a pair of lead wires for electrically connecting the thermosensitive body to an external circuit; and
the pair of lead wires extend in one direction with respect to the thermosensitive element, and extend into the holding member through one side surface of the holding member.

16. The temperature sensor according to claim 1, wherein:
the thermosensitive element includes a thermosensitive body having a resistance value that changes depending on temperature change, and a pair of lead wires for electrically connecting the thermosensitive body to an external circuit; and
the pair of lead wires extend in both directions with respect to the thermosensitive element, and extend into the holding member through both side surfaces of the holding member.

17. A temperature detection device comprising:
the temperature sensor according to claim 1; and
a circuit portion electrically connected to the temperature sensor and configured to calculate a temperature of the temperature measurement object based on a signal from the temperature sensor.

18. An image formation device that is an electrophotographic image formation device, the image formation device comprising:
a fixing device configured to fix toner to a recording medium by heating and pressurizing; and
the temperature sensor according to claim 1, the temperature sensor being configured to detect a temperature of a member included in the fixing device.

* * * * *